(12) United States Patent
Briscoe et al.

(10) Patent No.: US 8,767,778 B2
(45) Date of Patent: Jul. 1, 2014

(54) METHOD, SYSTEM AND APPARATUS FOR SYNCHRONIZING SIGNALS

(75) Inventors: Paul E. Briscoe, Toronto (CA); Leigh A. Whitcomb, Toronto (CA); Michel A. Poulin, Pickering (CA)

(73) Assignee: Imagine Communications Corp., Englewood, CO (US)

( * ) Notice: Subject to any disclaimer, the term of this patent is extended or adjusted under 35 U.S.C. 154(b) by 797 days.

(21) Appl. No.: 12/510,602

(22) Filed: Jul. 28, 2009

(65) Prior Publication Data
US 2010/0135334 A1 Jun. 3, 2010

(30) Foreign Application Priority Data

Jul. 28, 2008 (EP) ..................................... 08013557

(51) Int. Cl.
*H04J 3/06* (2006.01)
(52) U.S. Cl.
USPC .......................................... 370/503; 370/516
(58) Field of Classification Search
USPC ........................... 370/503, 509, 510, 516, 518
See application file for complete search history.

(56) References Cited

U.S. PATENT DOCUMENTS

| | | | | |
|---|---|---|---|---|
| 5,537,549 A | * | 7/1996 | Gee et al. ....................... | 709/224 |
| 6,191,821 B1 | * | 2/2001 | Kupnicki ....................... | 348/512 |
| 6,198,720 B1 | * | 3/2001 | Deschaine et al. ............ | 370/220 |
| 6,516,040 B1 | * | 2/2003 | Lecourtier et al. ............ | 375/356 |
| 8,095,615 B2 | * | 1/2012 | Briscoe et al. ................ | 709/208 |
| 2004/0264478 A1 | | 12/2004 | Van Der Valk et al. .. | 370/395.62 |
| 2007/0110074 A1 | * | 5/2007 | Bradley et al. ............ | 370/395.51 |
| 2007/0266119 A1 | * | 11/2007 | Ohly .............................. | 709/220 |
| 2009/0097504 A1 | * | 4/2009 | Potenza et al. ................ | 370/498 |

FOREIGN PATENT DOCUMENTS

| | | | | |
|---|---|---|---|---|
| CA | 2239317 | | 11/1998 | ............... H04N 5/04 |
| FR | 2898454 A | | 9/2007 | ............... H04L 12/56 |
| WO | WO99/60755 | | 11/1999 | ............... H04L 12/56 |
| WO | WO2006/110960 | | 10/2006 | ............... H04L 12/54 |

* cited by examiner

*Primary Examiner* — Ricky Ngo
*Assistant Examiner* — Christine Ng
(74) *Attorney, Agent, or Firm* — Tarolli, Sundheim, Covell & Tummino LLP

(57) ABSTRACT

A system for synchronizing unrelated information or reference signals originating from multiple sources. The signals may be in different signal formats or subject to different delays at a receiving device. The system may include a master reference time generator connected to at least one of a plurality of slave reference signal generators via a packet network. The master reference time generator may include a master reference time counter and a sampling device for sampling the master reference time counter. The master reference time generator may encode time data in master reference time packets and feed these packets into the packet network. The slave reference signal generator(s) is adapted to accept the encoded time data as an input to generate a reference signal, the phase of which is calculated based on the time elapsed since an initial time point.

15 Claims, 5 Drawing Sheets

METHOD, SYSTEM AND APPARATUS FOR SYNCHRONIZING SIGNALS

FIELD OF THE INVENTION

The present invention relates to field of signal processing and, more particularly, to systems for synchronizing unrelated reference signals associated with information signals (e.g., video or audio signals) originating from multiple sources, such as at geographically different locations and/or in different formats, and related methods.

BACKGROUND OF THE INVENTION

There are many situations in which signals from sources at different locations need to be integrated or combined, e.g., a video signal and its associated audio signal. Another example is an video signal received from a satellite feed or microwave repeater relay network which may have its associated audio signal transmitted to the broadcast facility over land lines (e.g., telephone lines). In other cases a remote video feed may be integrated with a local video signal, e.g., in a news broadcast or a live interview between the broadcast facility and a remote location.

In general, video and audio or multimedia equipment uses an external "Genlock" reference signal for synchronization. Genlock is commonly used in video post-production, nonlinear editing, and broadcast studios, etc. Its use ensures that a video and audio or multimedia equipment's information output is locked (LOCK) to an externally generated signal (GEN), so that the studio's devices (e.g., cameras, videotape recorders, character or title generators, etc.) work together correctly. Through Genlock, the information output may be synchronized to an external source. The Genlock reference signal generally takes the form of a normal video/audio information signal, but without any program content.

A Genlock reference signal is produced by a sync generator that generates a signal of the same frequency as an information signal, but with precise timing signals that are not subject to frequency drift or time base errors which might affect the information signal. In an analog color video signal, for example, the sync generator generates horizontal sync, vertical sync, color reference, burst flag and blanking pulses, typically as a color black reference signal, at precise intervals corresponding to the nominal specifications for the format of the particular signal being processed.

While signals that conform to the NTSC standard or to the PAL standard are still in use today and will continue to be for the foreseeable future, the advent of digital technologies has enabled the widespread use of Standard Definition and High Definition television, both in the baseband and compressed (MPEG-2, -4, etc.) domains. The new digital TV standards utilize digital broadcasting/multimedia equipment that needs to be synchronized.

Video signals originating from and within a broadcast facility are Genlocked to the reference signal generated by a master generator, which provides a common timing reference for aligning the various signals. The phasing of two information signals of the video type involves multiple levels of alignment. First, the vertical alignment to the nearest vertical sync pulse is performed. Then, the correct horizontal line is aligned. On the next level, each picture is synchronized spatially (horizontal and vertical). In an analog composite system, additional phasing of the subcarrier is finally carried out to achieve the correct color reproduction.

In modern digital systems, the concept of subcarrier no longer exists and only horizontal and vertical phasing is required. Two signals which exhibit vertical and horizontal (and subcarrier, if applicable) alignment are said to be synchronous, and can be used together without further timing adjustment in a production process such as switching, mixing, superimposition, etc.

In some, situations it may become necessary to combine information signals originating from sources at different locations. The lengths of the signal paths may differ, such as where a video signal is relayed via satellite and its associated audio signal is transmitted over land lines, which causes a delay differential between the signals, or independent video signals containing information relating to a common event. For example, for a local interviewer interviewing a person at remote location, or a panel discussion between panelists in different cities, may arrive at the broadcast facility at different times if the signal paths differ. Each remote signal source may be locked to an independent reference signal, which may not be in precise alignment with other unrelated reference signals or the reference signal used by the broadcast facility.

The Society of Motion Picture and Television Engineers (SMPTE) and the European Broadcasting Union (EBU) are looking into developments in the broadcast infrastructure synchronization (see, e.g. www.ebu-acip.org). Audio over IP (Internet Protocol) terminals are increasingly being used in radio operations for streaming of radio programs over IP networks from remote sites or local offices into main studio centers. The Internet is increasingly also used for various scenarios of video/audio/multimedia contribution, especially over longer distances. News correspondents will have the choice in their equipment to use either ISDN or the Internet via ADSL or other available IP networks to deliver their reports. With very few exceptions, IP equipment from one manufacturer has until now not been compatible, let alone synchronizable, with another manufacturer's unit.

One approach to signal synchronization is outlined in U.S. Pat. No. 6,191,821 (Kupnicki). Another approach is provided in FR 2007/050918, which is directed to transmitting a synchronizing signal in a packet network having two or more stations. Image cues are extracted from a synchronizing signal. A first counter is initialized based on the image cues. A program dock reference counter is initialized every second or higher zero crossing of the first counter. The program clock reference counter samples all the Tech periods. Tech is derived from a time base synchronized on all the network stations. Packets containing the samples are transmitted in the network. The synchronizing signal is a Genlock signal. The time base synchronized on all the network stations is an IEC 1588 time base.

Another example is FR 2007/050919, which is directed to a secure mechanism for transmission of a synchronizing signal in a packet network. A device transmits packets in a packet communication network comprising two or more stations. The device has a signal receiver and can control a counter using the received signal. The counter samples every Tech periods. Tech is derived from a time base synchronized on all the stations of the network. An incremental value predicting at least a next sampled value of the counter is calculated. Sampled values and associated incremental values are transmitted in packets. The time base synchronized on all the network stations is an IEC 1588 time base. The received signal is of Genlock (synchronization lock) signal. The communication network is an IP (Internet Protocol) network.

Still another example is FR 2007/050914, which is directed to generating and operating a double temporal descriptor for transmitting a synchronizing signal in a packet network. Packets are transmitted in a packet communication network comprising two or more stations. A signal receiver is adapted to derive a frequency and a phase from a received signal. A master counter is provided and initialized by the derived frequency and phase. A sampling device samples the value of the master counter at regular intervals. From a sampled value of the master counter, a first temporal descriptor is generated. A second counter is synchronized on all network stations at the same instant when the sampling of the master counter occurs. A second temporal descriptor is generated from a sampled value of the second counter. The two temporal descriptors are jointly transmitted in the network. The packet communication network is an IP network. The second counter is synchronized on all the network stations by means of the IEC 1588 standard. The received signal is a Genlock signal.

SUMMARY OF THE INVENTION

In view of the envisioned increase of choices for the mode of video/audio/multimedia signal transport, there is a need to maintain or improve the functionality and capabilities of broadcasting/multimedia equipment.

A system is disclosed herein which is suited for synchronizing unrelated information and/or reference signals originating from two or more broadcasting/multimedia equipment sources wherein the signals may be in different signal formats and/or subject to different delays at a receiving device. The system may include a master reference time generator connected to at least one of a plurality of slave reference signal generators via a packet network. The master reference time generator may include a master reference time counter and a sampling device for sampling the master reference time counter. The master reference time generator may encode time data in master reference time packets and feeds these packets into the packet network.

The slave reference signal generator(s) may be adapted to accept the encoded time data as an input to generate a reference signal, the phase of which is calculated based on the time elapsed since an initial time point. The slave reference signal generator(s) may include a slave reference time counter to generate time data elapsed from the initial time point. The slave reference time counter may be connected to a sampling device for sampling the slave reference time counter. The master reference time counter and the slave reference time counter may be sampled at time points derived from a time base synchronized on the master reference time generator and all of the slave reference signal generators of the network.

An arbitrary point in time may be selected as the initial time point (t=0), at which all unrelated information and/or reference signals, their clock edges and their phase relationships are deemed to be in alignment. The slave reference time counter may be processed further to deterministically generate any epoch-aligned signal. A network distributed timekeeping service may be provided to the master reference time generator and the slave reference signal generators on the network. The master reference time generator may be adapted to accept an absolute time reference as an input which is either an externally provided time, or an optional time base to load and clock the counter of the master reference time generator, or the time and time base may be local to the master reference time generator.

A precision time counter may be locked to an external source of time, such as a GPS source. The master generator may deliver this precision time counter's timekeeping information to a plurality of slave devices which may then lock their counters to the master as described herein. Thus, the master and slaves may all contain time counters running synchronously. These time counters may be used to synthesize information signals of the broadcasting/multimedia equipment sources.

The phase of reference signals of interest may be defined at some prior point in time ("epoch"), therefore the phase of a reference signal may be calculated at any subsequent point in time. The slave generators may generate a desired reference signal with a known relationship to absolute time, and thus multiple slave generators may independently generate synchronous copies of the same signal. These aligned reference signals may then be used to align independent information signals. This approach provides for time being derived from an external global source, and being instantiated in the master generator.

Reference signals such as Genlock signals traditionally take the form of an information signal. Slave devices may be of two types which use a Genlock reference. One type produces legacy reference Genlock signals in the form of information signals, and the other type is an actual content (media) processing device which directly generates information signals. In the past, this device would be locked to the reference Genlock signal. The apparatus/method described herein may be used to generate reference signals (as information signals in a slave generator) that are in turn used to lock other equipment (which handles the content, also as information signals). The output of that equipment may be in the form of information signals. This method may also be used to directly allow the content handling devices to directly generate the output information signals without the use of an intermediate reference signal.

The inserted data packets may contain a master reference signal comprising a future network time count and a future reference time count. The master reference time generator may be adapted to simultaneously sample the network distributed time count and the master reference time count values and, for each of the time counts sampled, calculate a future time count value. The master reference time generator may be adapted to send the future network time count and future reference time count via the packet network to at least one of the slave reference signal generators. The slave reference signal generator(s) may include a reference time counter which is clocked by a local time base. A phase locked loop may be implemented to lock the slave reference time counter using the incoming master reference time and the locally running slave reference time data.

At device startup, the counter at the slave reference signal generator may be loaded with the most recently received reference time count. Upon receipt of a future reference time count, the slave information signal generator(s) may place a future network time count into a comparator to perform a comparison with the running network time. At the instant where the running network time equals the compared future network time count, the reference time counter of the slave information signal generator may be sampled, and the local reference time count may be compared to the received future reference time count. A time error resulting from the comparison may be used to control the time base of the slave reference signal generator. Using the present system, a time reference signal may be distributed over an IP network to synchronize, in the sub-microsecond range, broadcasting/multimedia devices using the same network that also transports the TV/radio/multimedia information data.

A master reference time generator is also disclosed for transmitting signals for synchronizing unrelated information signals originating from two or more broadcasting/multimedia equipment sources wherein the signals may be in different signal formats and/or subject to different delays at a receiving device. The master reference time generator may include a counter to generate time code data representing time elapsed from an initial time point. The counter may be adapted to be repeatedly sampled to obtain samplings, where the time interval lapsed between two subsequent samplings is derived from a time base synchronized on at least one receiving device of a communication network to which the transmitter device is connected. The master reference time generator may transmit packets containing the samplings in the network to the at least one receiving device. The master reference time generator may transmit the packets in the communication network. The time base synchronized on all the network stations is preferably of the IEC 1588 type.

A slave reference signal generator is disclosed which is to be connected to a packet network for receiving packets containing samples. The samples may originate in sampled data transmitted by the master reference time generator. The slave reference signal generator may be adapted to regenerate the sampling of a counter, preferably by a phase locked loop. The slave reference signal generator may be adapted to calculate a phase of an information reference signal based on the time elapsed since an initial time point.

The method may use a non-deterministic packet-oriented computer network, for example an IP network, for transport of Genlock synchronization information. The method may use network distributed time services, such as IEEE 1588, to be present and operating on the network. This service may be used in the master and slave devices of this method. A master Genlock reference generator may inserts packet, for example UDP datagrams, into the network. The master Genlock generator may use an externally provided time and time base to load and clock the Genlock local time counter. Alternatively, time and time base may be local to the master Genlock generator. The master, on a recurring basis, for example 1 second, may simultaneously sample the network distributed time count and the master Genlock time count values. For each of the time counts sampled, the master may calculate a future time count value, for example one second later.

The future network distributed time count and future Genlock time count may be sent across the network to the slaves in the form of an IP packet, for example as UDP datagrams. The slave device may include a Genlock time counter which is clocked by a local time base. At device startup, the slave may load the time counter with the most recent master time sample. This is optional to achieve fast locking. Upon receipt of a Genlock packet, the slave may place the future network time into a comparator where ongoing comparison with the running network time is made. At the instant where the running network time equals the latched future time, the local Genlock time counter may be sampled. The local Genlock counter may be compared to the received future Genlock counter time value. This error may be used to manage the local Genlock counter.

For large errors (such as at startup), the time may be loaded directly into the counter to achieve fast convergence. For ongoing operation, the error may be used, with appropriate loop filtering, to manage the local time base clocking the Genlock counter. The local Genlock counter and time base may be used to generate alternate time bases specific to the video/audio signals and processing required. The local counter may be used to generate audio/video reference timing signals.

DETAILED DESCRIPTION OF THE PREFERRED EMBODIMENTS

Figure 1:
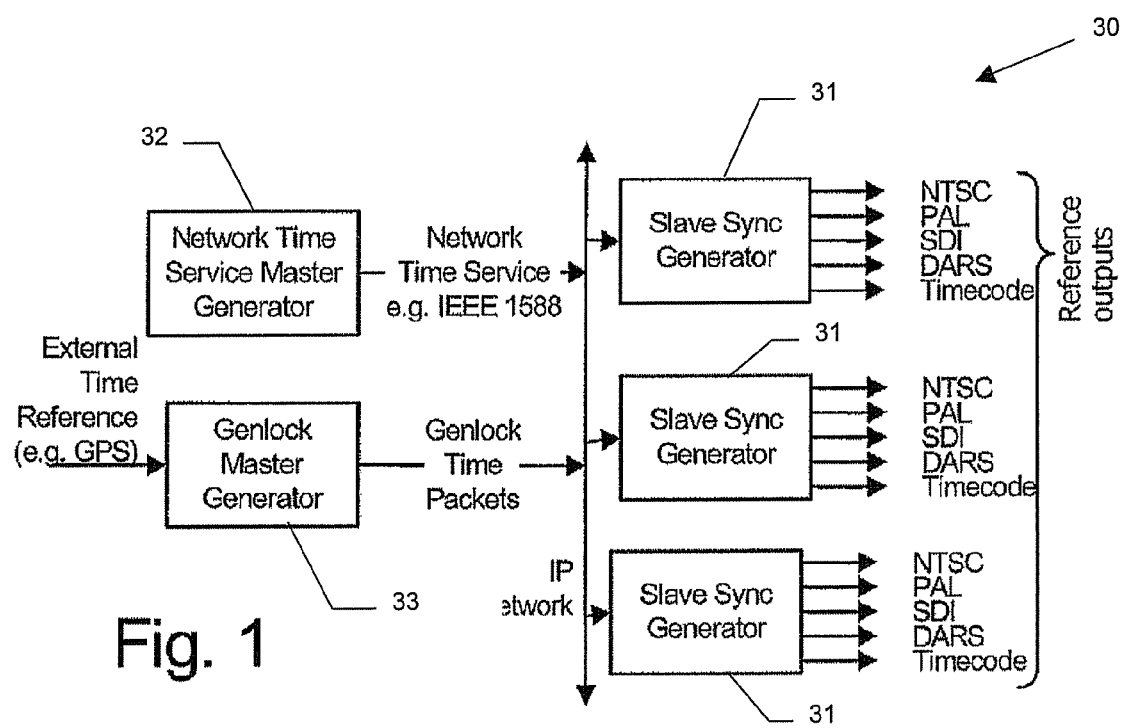
FIG. 1 is a schematic block diagram illustrating a mode for synchronization of signals at multiple slave devices with a master generator that provides distributed precision network time service to slave reference signal generator devices in accordance with an exemplary embodiment.

The present method and apparatus allows the synchronization of two or more video/audio/multimedia sources, such as, but not limited to video cameras, television cameras, and videotape machines. Without this synchronization, switching between the sources will, for example, result in a momentary loss of image stability while the monitor or other equipment tries to lock itself to the new signal. A familiar analogy is the momentary breakup of a TV image when switching from one station to another, as opposed to the smooth transitions between scenes on a TV show.

Distributing a Genlock reference signal over a (non-deterministic) IP network allows for synchronization of the broadcasting/multimedia equipment. Using a network time distribution system (e.g., an IP system) provides synchronized time in each receiving (slave) device to be Genlocked. There is no direct transfer of a time base (frequency) from master to slave, only the transfer of precise (absolute) time. Through the precise timekeeping counter operating in the slave device and the slave device being 'fed' as proposed herein, the slave time base frequency may be locked to that of the master.

A technical problem that is resolved with the present system/method is the deterministic generation of one or more related or unrelated reference signals across a packet-switched network with non-constant transmission time. While the prior art concepts like FR 2007/050918 extract "image cues" from video and operate a program clock reference (PCR) counter at a certain frequency (i.e., 27 MHz), the present system/method uses high precision time distributed via a non-deterministic packet oriented network, and operates a time counter at whatever frequency is desired to synchronize slaves to a master. The present system/method utilizes an IP network for distribution of precise time in packets to provide Genlock synchronization data/signals.

A Precision Time Protocol (PTP), like IEEE 1588, allows for a very precise time synchronization via an IP network or another non-deterministic packet oriented network, e.g., Ethernet. This protocol allows for the synchronization, in the sub-microsecond range, the broadcasting/multimedia devices using the same (Ethernet) network that also transports the TV/radio/multimedia data. Similar time synchronization protocols such as NTP and SNTP may be used, but may not be as well suited as they may not achieve the required synchronization accuracy or the convergence speed. The timekeeping service such as IEEE 1588, which provides a distributed time service using private traffic on an IP network, is enhanced through the use of specialized switches.

In the present method/system, the time count and time base may be derived from a global source (such as GPS) or any other precise electronic clock that creates its own timing signals for synchronization and measurement purposes downstream (e.g., time base). According to the present method/system, a signal phase is declared at some epoch (t=0), and such signal may be deterministically regenerated by one or more slaves, such that the output signals of those slaves (which are independent of each other) will be synchronous.

An arbitrary point in time may selected as the initial time point (t=0), an epoch at which unrelated information and/or reference signals, their clock edges and their phase relationships are deemed to be in alignment. A network distributed timekeeping service may be provided to the master reference time generator and the slave information signal generators on the network. At the master reference time generator, an absolute time reference may be accepted as an input which is either an externally provided time, or an optional time base to load and clock the counter of the master reference time generator, or the time and time base are local to the master reference time generator. The inserted data packets may be provided with a master reference signal comprising a future network time count and a future reference time count.

At the master reference time generator, the network distributed time count and the master reference time count values may be simultaneously sampled and, for each of the time counts sampled, a future time count value may be calculated. From the master reference time generator, the future network time count and future reference time count may be sent via the packet network to at least one of the slave reference signal generators. At least one of the slave reference signal generators may clock a reference time counter by a local time base. A phase locked loop may be implemented to lock the slave reference time counter using the incoming master reference time and the locally running slave reference time data. At device startup the counter at the slave reference signal generator may be loaded with the most recently received reference time count.

Upon receipt of a future reference time count at the at least one of the slave reference signal generators, a future network time count may be placed into a comparator to perform a comparison with the running network time. At the instant where the running network time equals the compared future network time count, the reference time counter of the slave reference signal generator may be sampled, and the local reference time count may be compared to the received future reference time count. Any time error resulting from the comparison may be used to control the time base of the slave reference signal generator. A time reference signal may be distributed over an IP network to synchronize, in the sub-microsecond range, broadcasting/multimedia devices using the same network that also transports the TV/radio/multimedia information data.

To have a set of slave devices determine the offset between time measurements on their clocks and time measurements on a master device, the following procedure may be used. It is, however, only one exemplary mode of action, and other suitable modes may also be used in accordance with the present system/method.

Let the variable t represent physical time. For a given slave device, the offset o(t) at time t is defined by: $o(t)=s(t)-m(t)$, where $s(t)$ represents the time measured on the slave device's clock at physical time t, and $m(t)$ represents the time measured on the master device's clock at physical time t. Let the master device periodically launch an exchange of messages with slave devices to allow each slave clock re-compute the offset between its clock and the master's clock.

Assuming that the exchange of messages happens over a period of time so small that this offset can safely be considered constant. Another assumption is that the transit time of a message going from the master to a slave is equal to the transit time of a message going from the slave to the master. It is further assumed that both the master and slave can measure the time they send or receive a message. The degree to which these assumptions are enforced regulates the accuracy of the offset measured at a slave device.

Each message exchange begins with a SYNC message sent by the master clock to all the slaves listening. The master time stamps the time T1 measured on its clock when it sends this message. A slave receiving this SYNC message takes note of the time T2 measured on its clock when it receives this SYNC message. If d is the transit time of this SYNC message, and õ is the constant offset during this transaction, then:

$$T2-T1=\tilde{o}+d. \tag{1}$$

Next, the master sends a multicast TIME T1 message to notify the slaves of which time the master measured when it sent the SYNC message. Each slave now knows T1 and T2. Each slave now sends a RESPONSE message back to the master. The slave measures the time T3 that the slave sends this RESPONSE message, and the master measures the time T4 that the master receives this RESPONSE message.

The master then sends a directed multicast TIME T4 message back to the slave to notify the slave what time the master received the RESPONSE message, here:

$$T4-T3=d-\tilde{o}. \tag{2}$$

The slave now knows times T1, T2, T3, and T4. Combining the above two equations (1) and (2), the offset during this transaction:

$$\tilde{o}=\tfrac{1}{2}\cdot(T2+T3-T1-T4),$$

can be computed in an appropriate computing device at the slave. The slave now knows the offset õ during this transaction. While this offset may drift with time, it will be corrected the next time this exchange of transactions is carried out.

The master reference generator having an absolute time input from a highly stable time source, for example an atomic clock or the Global Positioning System (GPS), generates a master reference signal. A time counter, which may be resolved to the order of picoseconds, is implemented from the initial time point and the time elapsed from the initial time point is periodically encoded into the master reference signal as time code data. For example, the time code date may comprise multiple bit words including an integer part that denotes the number of seconds and a fractional part that denotes the number of fractional seconds that have elapsed since the initial time point.

The slave generator associated with each information signal is Genlocked to the master reference signal, and the various information signals are locked to their respective slave reference outputs. Each synchronizing event is associated with time code data specifying the absolute time (relative to the initial time point) of the synchronizing event. Two signals can thus be aligned by delaying one of the signals according to a delay constant representing the phase offset of the signal as encoded into the previous frame of its associated slave reference signal. Thus, signal timings are detected in advance of the synchronizing event. This approach can be applied to synchronize reference signals in numerous formats, including but not limited to NTSC, PAL, AES, MPEG-2, Timecode, Time of Day, ATSC, and HDTV.

Two TV studios, possibly in geographically different locations, may be precisely synchronized via the Internet using a GPS system or another precise time source, so that transmission from one to the other would be synchronous and signal timings would be known in advance.

Referring now to FIG. 1, an apparatus 30 for providing synchronization of signals at multiple slave devices 31 is first described. In this system, by way of example, a master network time generator 32 provides distributed precision network time service to the slave generator devices 31 using a service such as IEEE 1588. In addition, a Genlock Master generator 33 provides Genlock time data packets to the network. The slave devices 31 receive the network distributed time as well as the Genlock time packets and use this information to deterministically generate video and audio reference signals. The independent slave generators 31 will all produce reference signals which are time-aligned and synchronous with each other.

Figure 2:
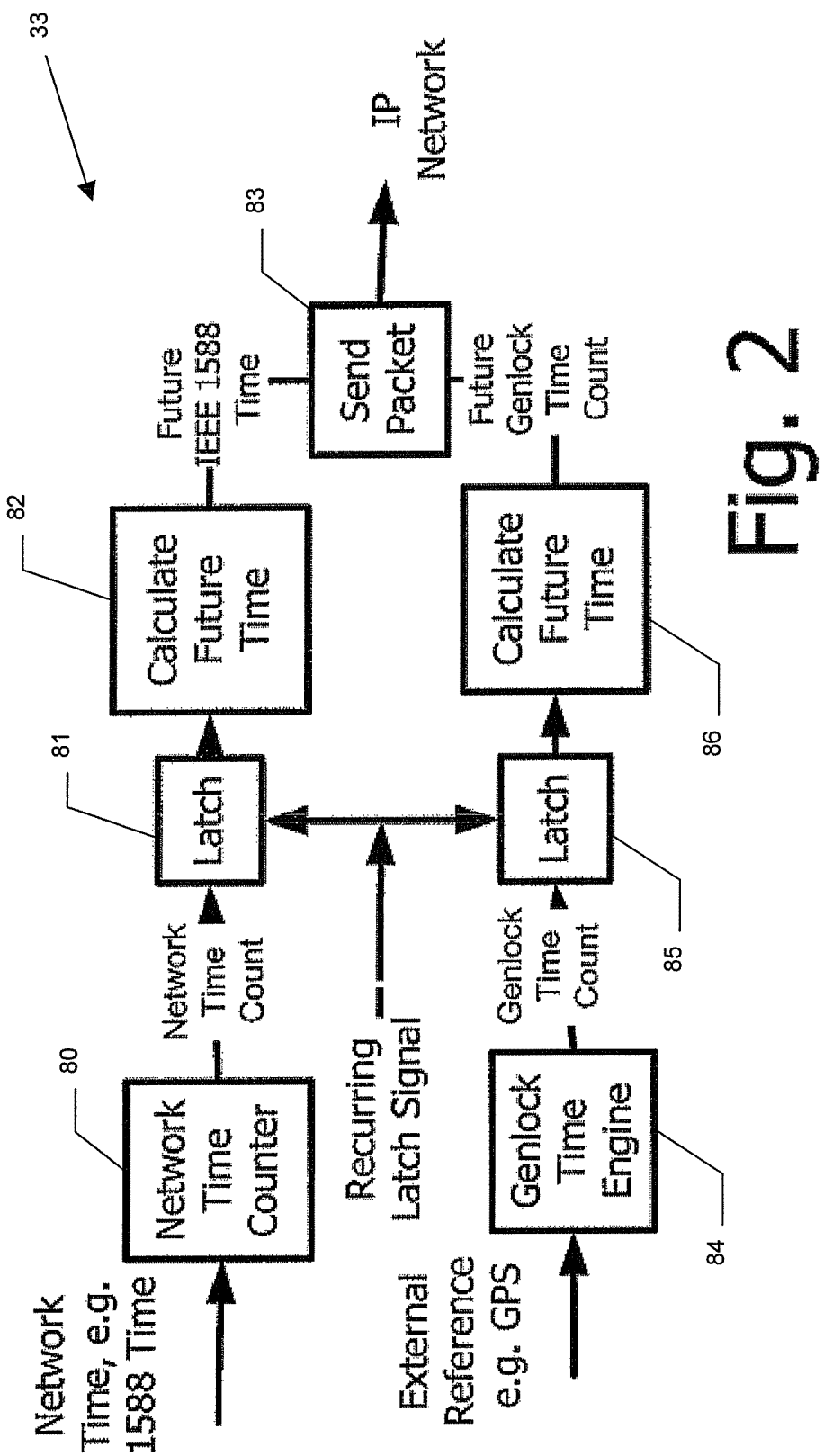
FIG. 2 is a schematic block diagram showing the master generator for the mode for synchronization of FIG. 1.

The master generator 33 as it is shown in FIG. 2 illustratively includes a crystal-controlled or other highly stable oscillator which generates a master reference signal. The master generator 33 preferably accepts an input from a time source, for example a highly stable reference such as an atomic clock or the Global Positioning System (GPS). Alternatively, the master generator may run on its own internal oscillator using last known time information. This generator may be specific to the implementation of a broadcast system, or may simply be the local 'house time' on the managed network infrastructure. In this example the master Genlock generator is a separate device from an IEEE 1588 master, and thus includes an IEEE 1588 slave. As such, it could readily be combined with the IEEE 1588 master generator in a different implementation.

On a recurring basis, the time counts in the Genlock counter and the network distributed time counter are sampled by simultaneously latching their values. These time counts are each processed by further calculation to establish their values at some future time, for example one second later. These new count values are prepared into a network packet, for example using the User (or Universal) Datagram Protocol (UDP), and transmitted on the network. UDP is one of the protocols of the Internet protocol. Using UDP, networked computers can communicate with one another using short messages sometimes known as datagrams. UDP does not guarantee reliability or ordering of the datagrams. Datagrams may arrive out of order, appear duplicated, or go missing without notice. Avoiding the overhead of checking whether every packet actually arrived makes UDP fast and efficient.

The network residency time is widely variable for this packet, and not all slaves will receive it at the same time. The magnitude of the future time calculation by the master is based on the average worst-case network latency expected, so that the likelihood of all slaves receiving the packet prior to the calculated future time is high.

The master Genlock generator 33 generates Genlock packets which are inserted into the network. These packets contain two primary payloads, including a future IEEE 1588 network reference time and a corresponding future Genlock time counter count value. On a recurring basis, the master generator 33 simultaneously samples its internal IEEE 1588 time and the value of the Genlock time counter. These times are further processed by calculation to determine their values at some future time, e.g., one second later. These two values are then bundled into a packet and delivered to the network for distribution to the slaves.

A mechanism suited for enabling the present concept is a network timekeeping service like IEEE 1588, IEC/ISO 1588 which provides a distributed time service using private traffic on an IP network, and may be optimized through the use of specialized switches. The reason for the specialized switches is that the precision of the protocol also depends on the latency jitter of the underlying network topology. Point-to-point connections provide the highest precision, with hubs imposing very little network jitter. Under very low or no network load, ISO Layer 2 switches have a very low processing time, typically 2 μs to 10 μs plus packet reception time. Switches with about 0.4 μs latency jitter are also available. However, switches are working with queues and store and forward, so only one queued maximum length packet imposes a delay for the following packet in the 100 μs range, and under high load conditions, more than one packet will be in the queue. Another factor for the precision of the protocol is that latency is entirely symmetric for both directions, from the master to the slave and vice-versa.

Reference signals are synchronized to align information signals associated with the reference signals. The information signals may be in different formats and/or may originate from different locations. As used herein an "information signal" or "information data" includes any signal which contains information in analog or digital form. These may include, for example, standard video signals such as NTSC, PAL, SDI, MPEG-2, MPEG-4, and ATSC, and/or audio signals such as AES digital audio, MP3, MP4, etc. The present approach may be applied to information signals that are to be aligned for superimposition, combination, integration, etc., by a broadcasting facility, editing facility or the like.

The master generator 33 reads time information from the absolute time input and synchronizes its IEEE 1588 master generator to it. By use of the associated external time base (for example from GPS), the IEEE 1588 master generator can provide extremely accurate time distribution to slave devices.

An arbitrary point in time is selected as an initial reference point (t=0), and all unrelated timing signals, clock edges and phase relationships are deemed to be in line or synchronized at the initial reference point. The Genlock time data will be used to calculate the position of each information signal at any later point in time at which the information signals are to be integrated or combined, and thus to calculate the phase offset of each signal relative to the other(s) so that compensating delays can be applied.

The slave generators 31 are each locked to the IEEE 1588 network time. Compensation procedures within the IEEE 1588 protocol provide for delay compensation between the master and each slave, and thus ensure that each slave contains the same absolute time data at any instant in time. Using the time data, the slave is able to synthesize output signals and their time bases. For a signal previously defined in phase at some prior point in time, it is possible to calculate by software the phase of that signal at another point in time. The slave employs the necessary calculations to derive the required phase for its output signals from the ongoing timekeeping data.

A time generator feeds time data in private packets into the IP network independently from the IEEE 1588 master generator. Each of the slave has a 1588 time engine operating in it, but additionally has an independent time engine which receives the time from the private packets. The master reference generator is a separate device from the 1588 master generator which can receive time and time base from an external source (such as GPS) and generates the time packets. It is possible that the 1588 master and Genlock master 33 be incorporated into one unit.

The slave sync reference generators 31 are adapted to accept the master reference signal. These slave sync generators 31 include calculation hardware and software to calculate timing differences of the unrelated signals at a later point in time based on time elapsed since the initial time point. They are also provided with hardware and software interfaces to receive the time data from the private packets in an independent time engine in order to generate a slave reference signal into which the time elapsed value or the time data from the private packets is encoded.

As the Genlock master generator provides Genlock packets to the network which transport the Genlock master absolute time as well as an IEEE 1588 reference time, the slave devices 31 independently can use the system time and Genlock time information to deterministically generate video and audio reference signals. The independent slave generators will all produce reference signals which are time-aligned and synchronous with each other.

Figure 3:
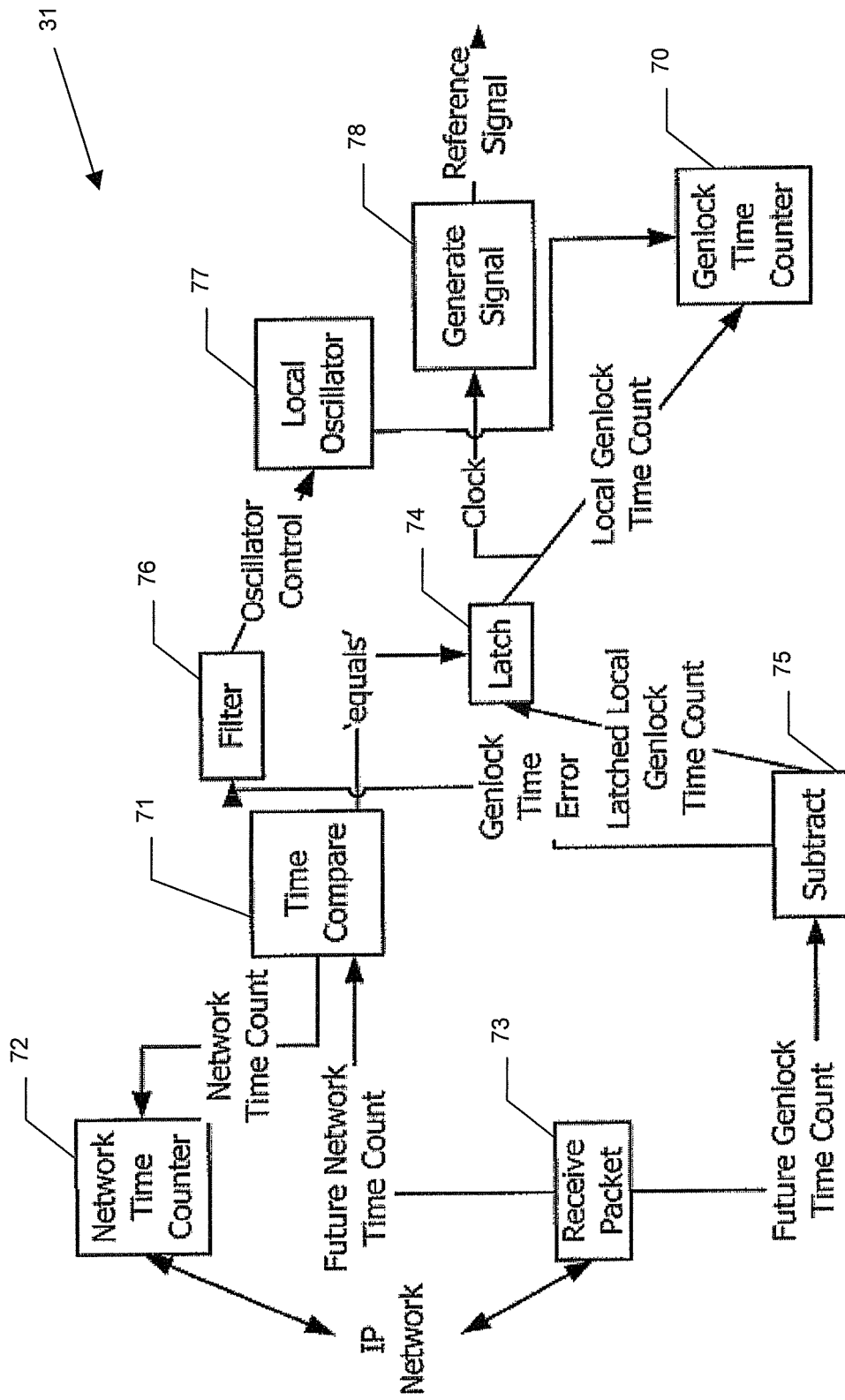
FIG. 3 is a schematic block diagram illustrating how a time packet is received at a slave device and a future reference time contained therein is latched into a comparator for comparison with the reference timekeeping ongoing in the slave in accordance with an exemplary embodiment.

The slave reference generator device 31 illustrated in FIG. 3 hosts the network time service, e.g., IEEE 1588, which provides an ongoing time count. In addition, a Genlock time counter 70 is implemented, clocked with a local time base. The Genlock packet is received and future network time contained therein is delivered to a comparator 71 for comparison with ongoing network distributed timekeeping. At the instant where time counter equals the comparison time, the received value of the local Genlock time counter is latched. This time is compared with the received Genlock counter time and an error value is produced. This error represents the time difference between the master Genlock counter and the local Genlock counter 70. This error value is used to steer the frequency of the local time base such that if the local counter is at an earlier count value than the network master counter 72 at the time of comparison, the time base frequency is raised to increase the count rate of the local counter. Conversely, if the local counter 70 has a greater count value than the master 72, the time base frequency is reduced. The slave reference generator device 31 further illustratively includes a subtractor 75 receiving the future Genlock time count, a filter 76 coupled to the output of the subtractor, a local oscillator 77 coupled to the filter output, and a reference signal generator 78 receiving the clock signal as an input.

From comparison to comparison, the frequency error of the local time base in the slave 31 can be measured as error in timekeeping and this information can be used to steer to local time base to the correct frequency over time, using loop filtering techniques. As a result, the slave Genlock time counter 70 will be synchronous to the Genlock time counter in the master 33 and signals derived from each slave will be synchronous to each other.

At startup or reconnection to the network after some time of standalone operation, the slave Genlock counter 70 can differ significantly from the master count such that in inordinate time would be required to synchronize counts by offsetting the local time base due to limits in the time base offset allowed by certain reference signal standards. In this event, a loop management algorithm would initiate loading the local Genlock counter 70 with the master sampled value to achieve a fast lock. Phase locking would commence thereafter. Now running in sync with the master counter, the slave counter can be used to synthesize Genlock reference signals.

As it is shown in FIG. 3, the packet 73 is received at a slave and a future IEEE 1588 time contained therein is latched via latch 74 into a comparator 71 for comparison with the IEEE 1588 time keeping ongoing in the slave. At the instant where the current time equals the comparison time, the received value of the Genlock time counter 70 is loaded into that counter. From comparison to comparison, the frequency error of the local time base in the slave 31 can be measured as error in timekeeping and this information may be used to steer/correct the local time base to the correct frequency over time. One way of implementing this is to use loop filtering techniques. As a result, the slave Genlock time counter 70 will be synchronous with or synchronized to the Genlock time counter 72 in the master 33, and signals derived from each slave will be synchronous to each other.

Figure 1A:
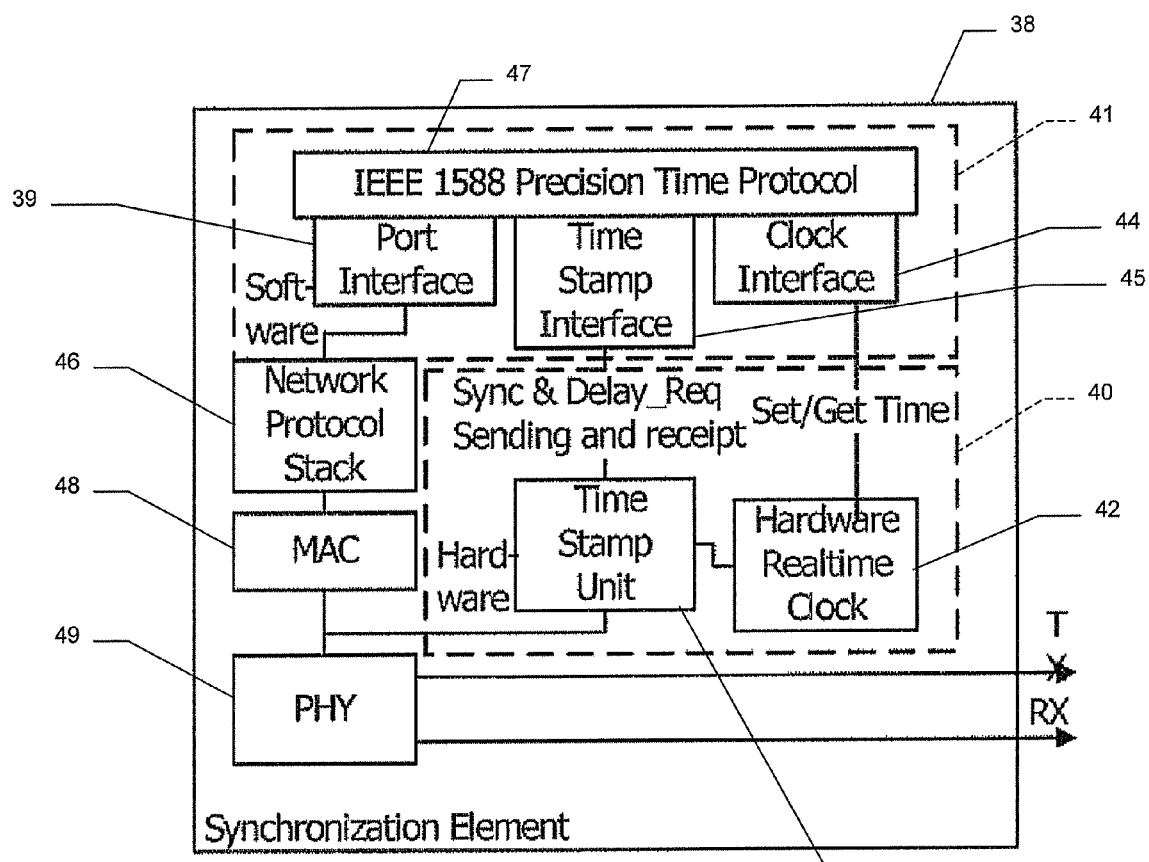
FIG. 1a is a schematic block diagram showing hardware and software components of a synchronization element in accordance with an exemplary embodiment.

The architecture of the master generator is based on the concept to separate the time-critical part, which is implemented in hardware 40, and the protocol itself, which is decoupled from hard real-time conditions, i.e., the software part 41. Thus the protocol may be executed in a low priority process and/or on a processor with relatively low performance requirements. The master generator 33 has a highly precise real-time clock 42 and a time stamp unit (TSU) 43 to generate the time stamp. The software part implements the actual IEEE 1588 protocol 47 with an interface to the real-time clock 44 and the hardware time stamp unit 45. FIG. 1a illustrates the cooperation of the hardware and software components of an IEEE 1588 synchronization element 38. A network protocol stack 46 and MAC/PHY layers 48, 49 interface with the software part 41 via a port interface 39.

Figure 1B:
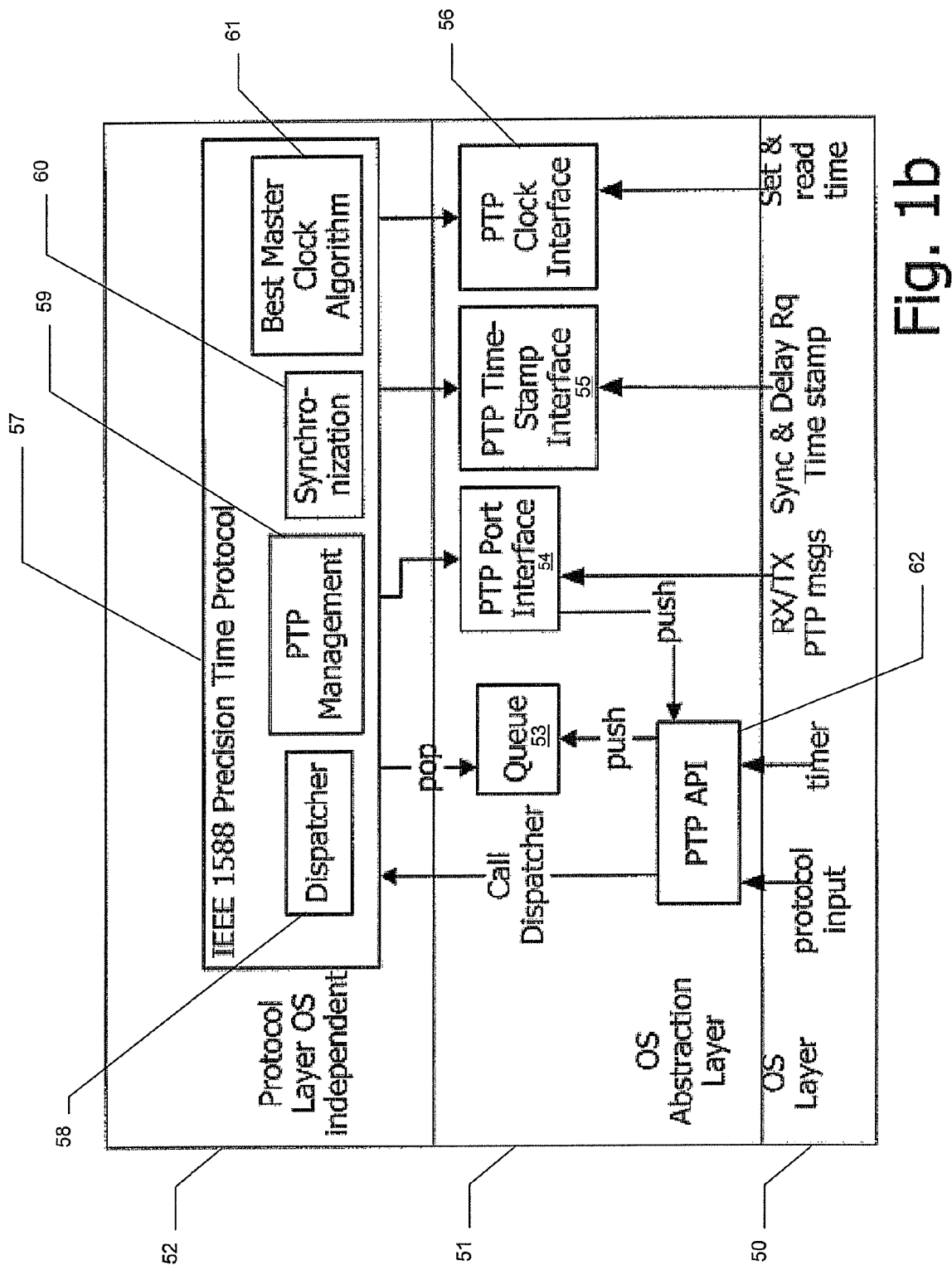
FIG. 1b is a schematic block diagram showing the interaction of the individual layers in accordance with an exemplary embodiment.

The intention of this architecture supports an Operating System (OS) 50 independent modeling of the software component. Three layers with different abstraction level are provided. The Protocol Layer 52 implements the operating system independent Precision Time Protocol (PTP). The OS Abstraction Layer 51 forms the interface between PTP and the selected operating system. The functions made available by the operating system—tasks/processes, semaphores, timers, sockets, etc.—are merged over the OS Layer 50. FIG. 1b illustrates the interaction of the individual layers. In particular, a network time counter 80 receives the network time (e.g., 1588 time), and outputs a network time count to a latch 81. Similarly, a Genlock time engine 84 receives an external time reference (e.g., GPS), and outputs a Genlock time count to a latch 85. Respective future time calculation modules 82, 86 are coupled to the latches 81, 85, and their respective outputs are coupled to a packet sender 83.

The Protocol Layer 52, which is OS independent, implements PTP for the synchronization of the devices in the IP network in a network. The actual processing for synchronizing the individual communication elements is located here. Within the Protocol Layer 52, the protocol dispatcher ensures the atomic execution of functions during an individual process. The communication between the protocol and the OS Abstraction Layer 51 is implemented by a queue 53 and three interfaces 54-56. The protocol layer OS 52 implements an IEEE 1588 precision time protocol 57 illustratively including a dispatcher 58, PTP manager 59, synchronizer 60 and master clock algorithm 61. A PTP API couples protocol and timer inputs from the OS layer 50 to the OS obstraction layer 51.

The middle layer, i.e. the OS abstraction layer 51, encases operating system dependent functions, which are to be adapted to the devices actually present in the network. The Timestamp Interface 55 provides the Precision Time Protocol with the seized time stamps of the Sync and Delay-Request messages. However, depending upon the stage of the precision requirement, either a Hardware unit, i.e. the TSU, or the software generates the time stamps. One possibility to generate "software time stamps" is in the operating system dependent NIC drivers (RX-ISR, sends process)—as near as possible at the transportation medium. The local clock is read and modified via the Clock Interface.

Implementations which do not have a hardware real-time clock can use the system clock of the operating system or optimized solutions as for example the nano-kernel under UNIX derivatives. Apart from setting the local clock, this interface contains the control algorithms which are responsible for the quality of time synchronization (accuracy, stability, transient behavior, etc.). The Port Interface 54 is used to dispatch and/or receive PTP messages. The IEEE 1588 telegrams use excluding UDP/IP multicast packets and thus make it possible to send and receive them over the socket interface of the IP protocol stack.

A clock or timer is a device providing a measurement of the passage of time since a defined epoch. There may be two types of clocks: boundary clocks and ordinary clocks. A boundary clock is a clock with more than a single PTP port, with each PTP port providing access to a separate PTP communication path. Boundary clocks are used to eliminate fluctuations produced by routers and similar network elements. The point in the outbound and inbound protocol stacks where this timestamp is generated is called the clock timestamp point.

The communication of PTP information between two PTP clocks with no intervening boundary clock is a direct communication. It is often desirable to synchronize a single clock to an external source of time, e.g., to a GPS system to establish a UTC time base. This synchronization is referred to as external synchronization. The reference time defining the origin of a time scale is termed the epoch. Within a collection of clocks one clock, the grandmaster clock, will serve as the primary source of time to which all others are ultimately synchronized. Within each region there will be a single clock, the master clock, serving as the primary source of time. The master clocks will in turn synchronize to other master clocks and ultimately to the grandmaster clock. Sync and Delay_Req messages contain a distinguished feature, the message timestamp point, serving as a reference point in these messages. When the message timestamp point passes the clock timestamp point, a timestamp is generated and used to compute the necessary corrections to the local clock. An ordinary clock is a clock with a single PTP port.

PTP is an acronym for Precision Time Protocol. A PTP domain is a collection of one or more PTP sub-domains. There are five designated message types: Sync, Delay_Req, Follow-up, Delay_Resp, and Management. PTP messages can be communicated via a multicast. In this style of communication any node may post a message and all nodes will receive this message.

A PTP port is the logical access point for communications to the clock containing the port. Two clocks are synchronized to a specified uncertainty if they have the same epoch and measurements of any time interval by both clocks differ by no more than the specified uncertainty. The timestamps generated by two synchronized clocks for the same event will differ by no more than the specified uncertainty.

While preferred apparatuses and methodologies having been thus described by way of example only, it will be apparent to those skilled in the art that certain modifications and adaptations may be made without departing from the scope of the appended claims.

That which is claimed is:

1. A signal synchronization system comprising:
    a plurality of slave reference signal generators;
    a master reference time generator; and
    a packet network connecting said master reference time generator to at least one of said plurality of slave reference signal generators;
    said master reference time generator comprising a master reference time counter and a master sampling device configured to sample an output of said master reference time counter;
    said master reference time generator configured to encode time data in master reference time packets and output the packets to said packet network, wherein the master reference time packets comprise a future network time count;
    said at least one slave reference signal generator configured to accept the encoded time data and the future network time count as inputs to generate a signal having a phase calculated based upon an elapsed time measured from an initial time point;
    said at least one slave reference signal generator comprising a slave reference time counter configured to generate time data elapsed from the initial time point and a slave sampling device configured to sample the time data;
    said master reference time counter and said slave reference time counter being sampled at time points derived from a time base synchronized on said master reference time generator and said at least one slave reference signal generator.

2. The system of claim 1 wherein said master reference time generator and said plurality of slave reference signal generators are coupled to a network distributed timekeeping service configured to provide a network distributed time count.

3. The system of claim 2 wherein said master reference time generator is operable to;
    simultaneously sample the network distributed time count and master reference time count values and calculate the future network time count value and a future reference time count; and
    send the future network time count and future reference time count via said packet network to at least one of said plurality of slave reference signal generators.

4. The system of claim 1 wherein said master reference time generator configured to accept a time reference comprising a time value and the time base.

5. The system of claim 1 wherein each slave reference signal generator comprises:
    a reference time counter providing local time data; and
    a phase locked loop to lock said slave reference time counter using the master reference time and the local slave reference time data.

6. The system of claim 1 wherein said signal synchronization system is configured to synchronize signals from at least one of a broadcast signal source and a multimedia signal source.

7. A master reference time generator comprising:
    a counter to generate time code data representing time elapsed from an initial time point; and
    a sampling device to repeatedly sample the time code data, and transmit packets comprising the sample and a future network time count to at least one receiving device to enable the at least one receiving device to generate a signal having a phase calculated based upon an elapsed time measured from an initial time point;
    wherein a time interval lapsed between subsequent samplings is derived from a time base synchronized on the master reference time generator and at least one receiving device.

8. The master reference time generator of claim 7 wherein said sampling device is operable to:
    simultaneously sample a network distributed time count and master reference time count values and calculate the future network time count value and the future reference time count; and
    send the future network time count and future reference time count to said at least one receiving device.

9. A slave information signal generator configured to receive packets comprising samples and a future network time count from a master reference time generator and comprising:
  a reference time counter and a sampling device cooperating therewith and configured to
    regenerate the samples from the master reference time reference generator; and
    calculate a phase of an information reference signal based upon the future network time count, the regenerated samples and a time interval elapsed since an initial time point;
  Wherein the time interval is derived from a time base synchronized n the master reference time generator and the slave reference signal generator.

10. The slave information signal generator of claim 9 wherein said reference time counter is configured to provide local time data; and further comprising a phase locked loop to lock said reference time counter using the master reference time and the local slave reference time data.

11. A signal synchronization method comprising:
  connecting a master reference time generator to at least one of a plurality of slave reference signal generators via a packet network, the master reference time generator comprising a master reference time counter and a master sampling device for sampling an output of the master reference time counter;
  encoding time data in master reference time packets at the master reference time generator and outputting the packets to the packet network, wherein the master reference time packets comprise a future network time count;
  accepting the encoded time data at the at least one slave reference signal generator and the future network time count as inputs to generate a signal having a phase calculated based upon an elapsed time measured from an initial time point, the at least one slave reference signal generator comprising a slave reference time counter to generate time data elapsed from the initial time point and a slave sampling device for sampling the time data; and
  sampling outputs of the master reference time counter and the slave reference time counter at time points derived from a time base synchronized on the master reference time generator and the slave reference signal generators.

12. The method of claim 11 further comprising coupling the master reference time generator and the plurality of slave reference signal generators to a network distributed timekeeping service providing a network distributed time count.

13. The method of claim 12 further comprising, at the master reference time generator:
  simultaneously sampling the network distributed time count and master reference time count values and calculating the future network time count value and a future reference time count; and
  sending the future network time count and future reference time count via the packet network to at least one of the plurality of slave reference signal generators.

14. The method of claim 11 further comprising accepting a time reference at the master reference time generator comprising a time value and the time base.

15. The method of claim 11 wherein each slave reference signal generator comprises:
  a reference time counter providing local time data; and
  a phase locked loop to lock the slave reference time counter using the master reference time and the local slave reference time data.

* * * * *